(12) United States Patent
Kelley

(10) Patent No.: US 6,296,210 B1
(45) Date of Patent: Oct. 2, 2001

(54) HANGER FOR GRADUATED MEASURING DEVICES

(75) Inventor: Drew Kelley, Buffalo, NY (US)

(73) Assignee: Robinson Knife Manufacturing Co., Inc., Buffalo, NY (US)

( * ) Notice: Subject to any disclaimer, the term of this patent is extended or adjusted under 35 U.S.C. 154(b) by 0 days.

(21) Appl. No.: 09/434,999

(22) Filed: Nov. 5, 1999

(51) Int. Cl.⁷ .................................................. A47G 21/14
(52) U.S. Cl. ................................. 248/37.3; 248/222.14; 248/309.2; 248/339
(58) Field of Search .................... 248/37.3, 37.6, 248/110, 205.2, 205.3, 206.5, 301, 302, 303, 304, 339, 222.14, 682, 690, 692, 309.2

(56) References Cited

U.S. PATENT DOCUMENTS

| | | | |
|---|---|---|---|
| D. 302,089 | * 7/1989 | Ancona et al. | D10/46.2 |
| D. 346,950 | * 5/1994 | Dunn et al. | D8/367 |
| 1,989,329 | * 1/1935 | McDonald | 248/222.14 |
| 2,245,126 | * 6/1941 | Day | 248/339 |
| 2,995,265 | * 8/1961 | Soderberg | 215/390 |
| 3,109,619 | * 11/1963 | Krug et al. | 248/690 |
| 3,311,339 | * 3/1967 | Frye | 248/205.3 |
| 3,433,449 | * 3/1969 | Musante | 248/497 |
| 3,655,061 | * 4/1972 | Peschcke-Koedt | 248/309.2 |
| 4,043,203 | * 8/1977 | Montesi | 73/427 |
| 4,589,159 | * 5/1986 | Streibel | 15/167.1 |
| 4,789,064 | * 12/1988 | Segal | 206/493 |
| 5,967,476 | * 10/1999 | Chen | 248/222.14 |

* cited by examiner

Primary Examiner—Anita King
(74) Attorney, Agent, or Firm—Hedman & Costigan, P.C.

(57) ABSTRACT

A hanger for suspending a plurality of graduated measuring devices comprising a first section having an engaging member thereon from which the hanger is supported, an elongated member on which the measuring devices are suspended and a stop for limiting movement of the measuring devices off of the hanger, said stop located at an end of the hanger opposite the first section and said elongated member operatively extending between the stop and the first section. The hanger is rigidly formed and, preferably, is a one piece structure.

6 Claims, 2 Drawing Sheets

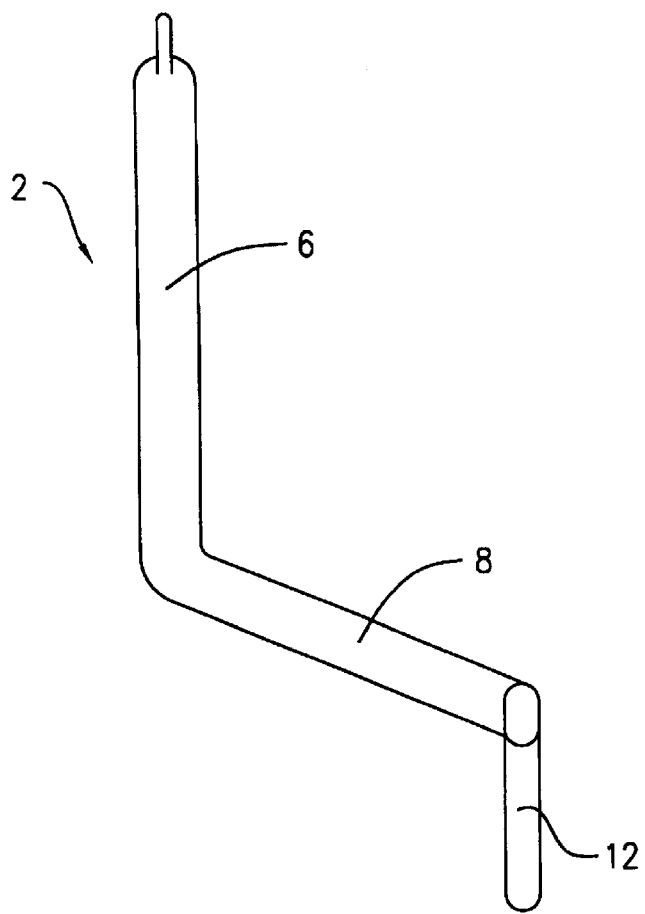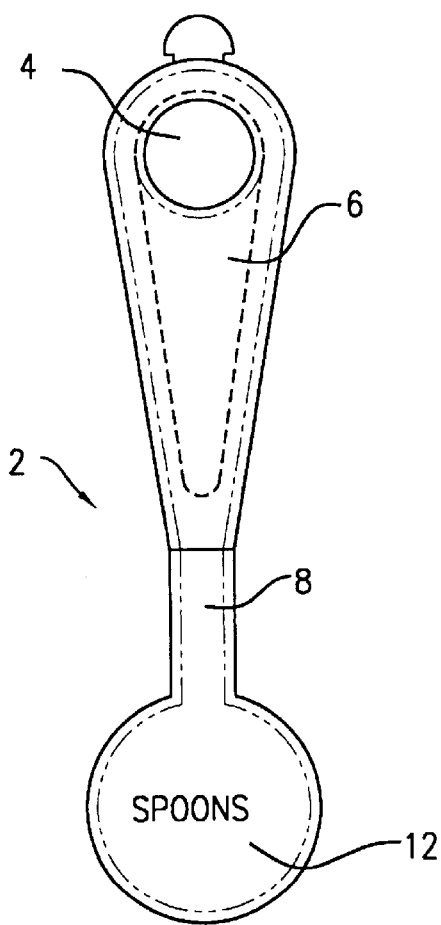
FIG. 1
FIG. 2

HANGER FOR GRADUATED MEASURING DEVICES

FIELD OF THE INVENTION

The invention relates to devices for hanging articles and more specifically devices for hanging a series of related articles.

BACKGROUND OF THE INVENTION

Devices for hanging multiple articles, such as graduated measuring cups or spoons, generally comprise an circular ring which can be opened. The articles usually have an opening in the handles through which the circular ring passes and the ring is then closed with the articles thereon. Once the articles are placed on the circular ring, and the circular ring is closed, it can be hung on a hook with the multiple articles suspended therefrom.

Since the circular hanger does not have a flat bottom and the articles are usually of varying length, the articles are often hanging spread apart from one another.

SUMMARY OF THE INVENTION

The present invention is directed to a hanger for suspending a plurality of graduated measuring devices comprising a first section having an engaging member from which the hanger is supported, a stop member for limiting movement of the measuring devices off of the elongated member wherein said stop is located at an end of the hanger opposite the first section and the elongated member operatively extends between the stop and the first section, further wherein the hanger is rigidly formed.

Preferably, the stop is substantially parallel to the first section with the elongated member extending at an angle therebetween. The angle preferably corresponds to the variation in sizes of a series of graduated devices.

BRIEF DESCRIPTION OF THE DRAWINGS

The following drawings, in which like reference characters indicate like parts, are intended to better illustrate the invention without limiting the invention in any manner whatsoever, wherein:

FIG. 1 is a side elevational view of the preferred hanger of the present invention;

FIG. 2 is a plan view of the preferred hanger of the present invention; and

DETAILED DESCRIPTION OF THE PREFERRED EMBODIMENT

Figure 3:
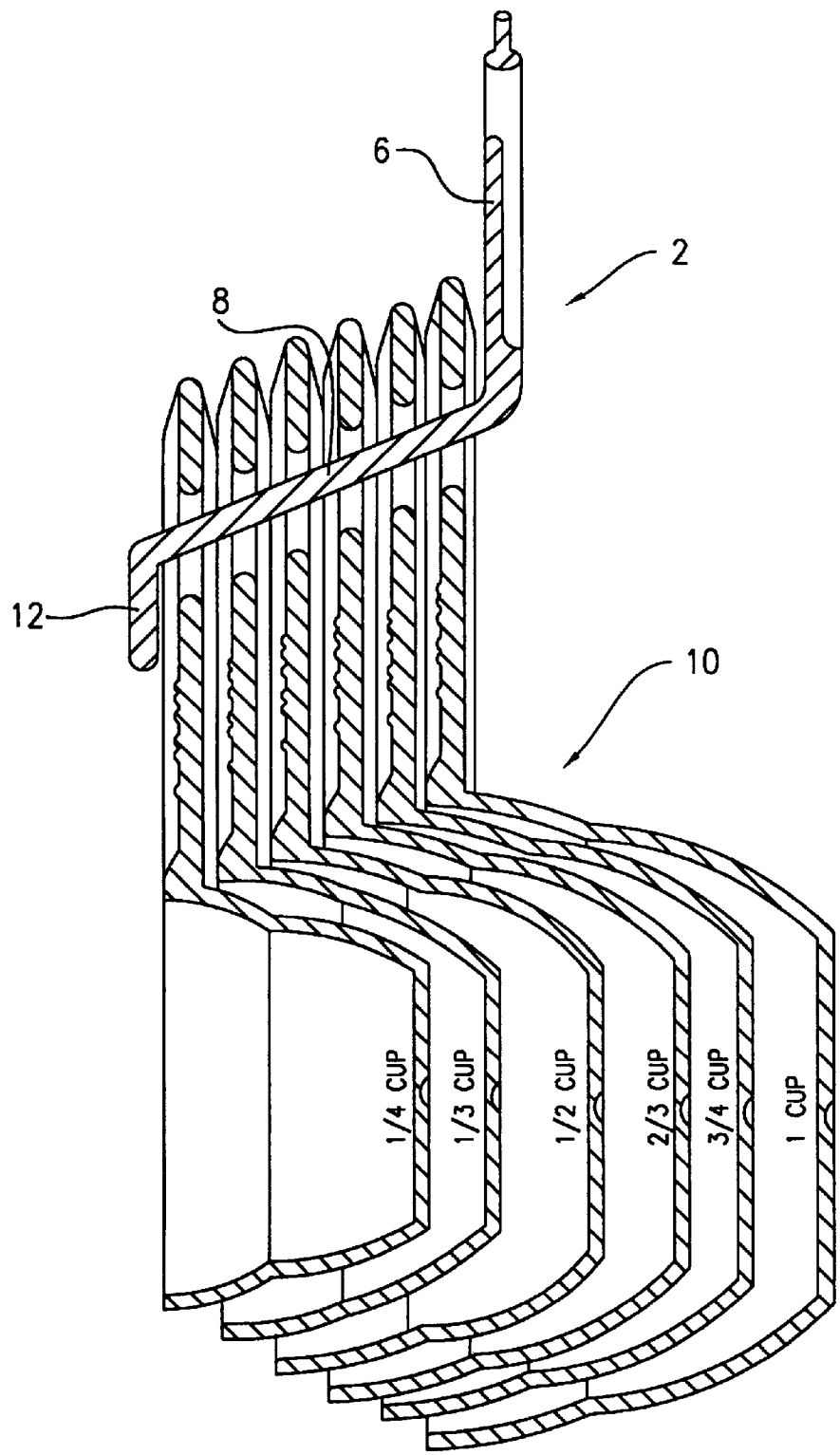
FIG. 3 is a cross sectional view of the preferred hanger of the present invention having a series of graduated articles suspended therefrom.

As shown in FIGS. 1 and 2, the hanger 2 of the present invention includes an engaging member such as an opening 4 on a first section 6 of the hanger 2 for accepting a hook or the like (not shown) to support the hanger 2. Extending from the first section 6 is an elongated member 8 for suspending a series of graduated measuring devices 10. The elongated member 8 terminates in a stop 12, the stop 12 being at the end of the hanger 2 opposite the opening 4.

The stop 12 is preferably parallel to the first section 6 with the elongated member 8 extending from the first section 6 to the stop 12 at an angle. The angle of the elongated member 8 is determined by the length of the handles and thickness of the container portions of the measuring devices being suspended thereon. Preferably, the angle is such that the successive handles of the measuring devices lie flat against adjacent handles with successive containers nesting within the container of the adjacent measuring device. See generally, FIG. 3.

The length of the elongated member 8 is determined by the number of measuring devices to be held and the thickness of the handles of the measuring devices. For example, if five (5) measuring cups are to be held and the handle of each is 0.25 inches, the elongated member 8 would preferably be slightly larger than 1.25 inches, most preferably about 1.30 inches.

The stop 12 is preferably disc shaped but can be any suitable shape. The size is not significant other than that it must be sufficient to prohibit the measuring devices from sliding off of the elongated member 8.

The engaging member is shown as an opening 4, however, it is understood that any suitable member may be used. For example, rather than an opening 4 the engaging member could itself be a hook on the first section 6 of the hanger 2 which can be hooked over a bar or the like. Similarly, the engaging member could be a closable ring or strap, velcro, snap, magnet, tab, or any known device which would support the hanger 2.

The hanger 2 of the present invention is preferably made as a one piece, unitary structure by injection molding. Many types of materials can be used but most preferred are rigid polymers, with polycarbonate, such as LEXAN, being most preferred.

Variations, modifications and alterations to the present invention will make themselves apparent to one skilled in the art reading this disclosure. All such variations, modifications and alterations are contemplated to fall within the spirit and scope of the invention, limited only by the following claims.

What is claimed is:

1. A hanger for suspending a plurality of graduated measuring devices, comprising a first section having an engaging member from which the hanger is supported, an elongated member for suspending the measuring devices and a stop member for limiting movement of the measuring devices off of the elongated member, wherein the elongated member operatively extends between the first section and the stop member at a downwardly depending angle and at least a portion of said stop member depends substantially downwardly at an end of the hanger opposite the first section, further wherein the hanger is rigidly formed.

2. The hanger of claim 1 wherein the stop is substantially parallel to the first section and the elongated member extends at an angle therebetween.

3. The hanger of claim 1 wherein the hanger is formed of a unitary material.

4. The hanger of claim 3 wherein the hanger is formed of a polymer.

5. The hanger of claim 4 wherein the hanger is formed of polycarbonate.

6. The hanger of claim 1 wherein the engaging member is an opening.

* * * * *